United States Patent
Johansson

(10) Patent No.: US 6,490,640 B1
(45) Date of Patent: Dec. 3, 2002

(54) PACKET DATA SWITCHING APPARATUS

(75) Inventor: Per Johansson, Lund (SE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 09/091,869

(22) PCT Filed: Dec. 30, 1996

(86) PCT No.: PCT/EP96/05866

§ 371 (c)(1),
(2), (4) Date: Nov. 13, 1998

(87) PCT Pub. No.: WO97/24904

PCT Pub. Date: Jul. 10, 1997

(30) Foreign Application Priority Data

Dec. 29, 1995 (GB) .............................. 9526688

(51) Int. Cl.[7] .............................. G06F 3/00; G06F 3/02; G06F 13/00
(52) U.S. Cl. .............................. 710/52; 710/5; 710/36; 710/131
(58) Field of Search .............................. 710/1, 131, 33, 710/34, 52, 36, 5; 370/395, 413, 415

(56) References Cited

U.S. PATENT DOCUMENTS

| 4,757,529 A | * | 7/1988 | Glapa et al. | 379/244 |
|---|---|---|---|---|
| 4,780,870 A | * | 10/1988 | McHarg et al. | 370/415 |
| 5,291,482 A | * | 3/1994 | McHarg et al. | 370/413 |
| 5,383,182 A | | 1/1995 | Therasse et al. | 370/60 |
| 5,455,820 A | * | 10/1995 | Yamada | 370/413 |
| 5,455,825 A | * | 10/1995 | Lauer et al. | 370/413 |
| 5,610,914 A | * | 3/1997 | Yamada | 370/395 |
| 5,619,500 A | * | 4/1997 | Hiekali | 370/414 |
| 5,629,928 A | * | 5/1997 | Calvignac et al. | 370/237 |
| 5,651,003 A | * | 7/1997 | Pearce et al. | 370/395 |
| 5,689,508 A | * | 11/1997 | Lyles | 370/391 |
| 5,719,853 A | * | 2/1998 | Ikeda | 370/229 |
| 5,818,840 A | * | 10/1998 | Adams | 370/395 |
| 5,835,491 A | * | 11/1998 | Davis et al. | 370/386 |
| 5,901,147 A | * | 5/1999 | Joffe | 370/412 |

FOREIGN PATENT DOCUMENTS

| EP | 0 405 530 A2 | 1/1991 |
|---|---|---|
| EP | 0 471 344 A1 | 2/1992 |
| EP | 0581486 A2 | 2/1994 |
| EP | 0676878 A1 | 10/1995 |
| EP | 0 681 385 A2 | 11/1995 |
| EP | 0 681 385 A3 | 8/1996 |
| EP | 0 405 530 B1 | 9/1996 |
| EP | 0 471 344 B1 | 2/1997 |
| EP | 0 405 530 A3 | 1/1999 |

OTHER PUBLICATIONS

Williams, K., Patents ACT 1977: Search Report Under Section 17(5); Mar. 27, 1996; United Kingdom Patent Office; pp. 1–3; In re: Application No. GB 9526688.8.

International Search Report; PCT/EP 96/05866; dated May 7, 1997.

* cited by examiner

Primary Examiner—Thomas Lee
Assistant Examiner—Chun Cao
(74) Attorney, Agent, or Firm—Jenkens & Gilchrist, A Professional Corporation

(57) ABSTRACT

There is disclosed a packet data switch which allows fair queuing, by assigning a priority value to received data, without requiring time-consuming searches, by storing pointers to the buffer memory in a first memory, and accessing the pointers through a second memory which is in the form of an array, addressable by the priority value. There is further disclosed a system which combines fair queuing and FIFO queuing, to avoid the need for excessive array size.

8 Claims, 7 Drawing Sheets

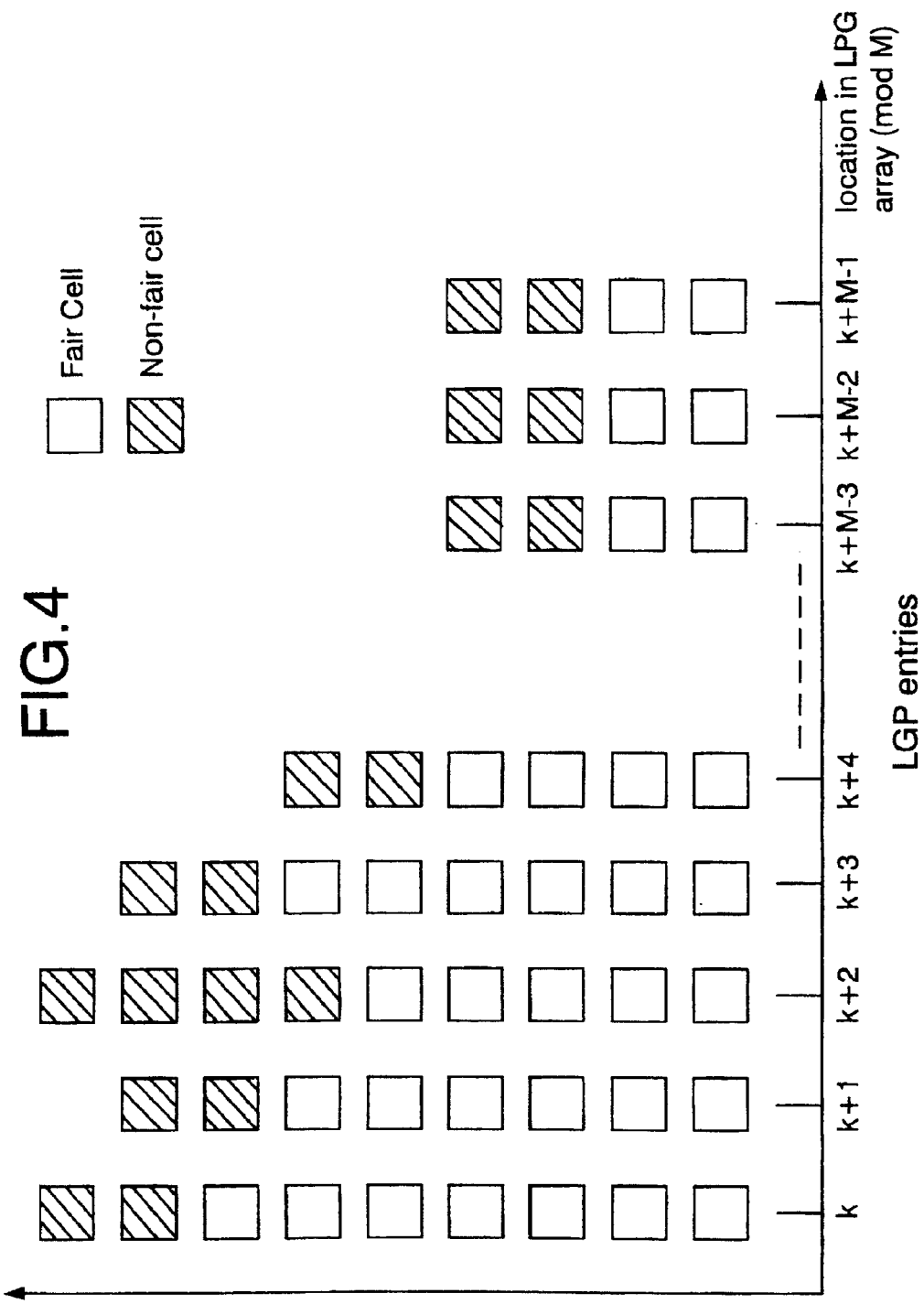

PACKET DATA SWITCHING APPARATUS

TECHNICAL FIELD

This invention relates to a switching device, and in particular to an ATM switching device which exhibits fairness in the way in which it handles incoming traffic at different inputs.

DESCRIPTION OF RELATED ART

One proposed solution to the problem of allocating network resources to the users of an integrated services network for packet-based traffic is known as Weighted Fair Queuing, in which arriving data packets are reordered so that they are retransmitted with a degree of fairness in the processor sharing system. See, for example, Parekh & Gallagher "A Generalized Processor Sharing Approach to Flow Control in Integrated Services Networks: The Single-Node Case" IEEE/ACM Transactions on Networking, Vol. 1, No. 3, June 1993. Such a system, however, can be very complex to implement.

U.S. Pat. No. 5,455,825 discloses a switch for digital communications networks, including a queuing system. When incoming cells or packets arrive, they are provided with numerical tags, calculated in accordance with a desired scheduling algorithm, and placed in a queue. A queue and search module, designed for VLSI implementation, selects the cells or packets for transmission based on the tags. Thus, the queue is searched, and, for each destination, the cell with the smallest tag value is sent for transmission. Such searching can, however, be time-consuming.

SUMMARY OF THE INVENTION

The present invention seeks to provide a switching device which provides fair queuing between its different input connections. In one aspect, this is achieved by storing received input data in a memory, together with an associated pointer, the pointer being indicative of a priority which is to be given to transmission of the data. The pointers are accessed through an array, which groups together the calls which have the same transmission, avoiding the need for lengthy searching. In another aspect, fair queuing is provided until the number of cells from a single input connection, awaiting transmission, exceeds a threshold number. Further cells from that input connection are then treated in a non-fair way.

BRIEF DESCRIPTION OF THE DRAWINGS

FIG. 4 is a schematic illustration of the cells available for transmission at one point in time.

DETAILED DESCRIPTION OF PREFERRED EMBODIMENT

Figure 1:
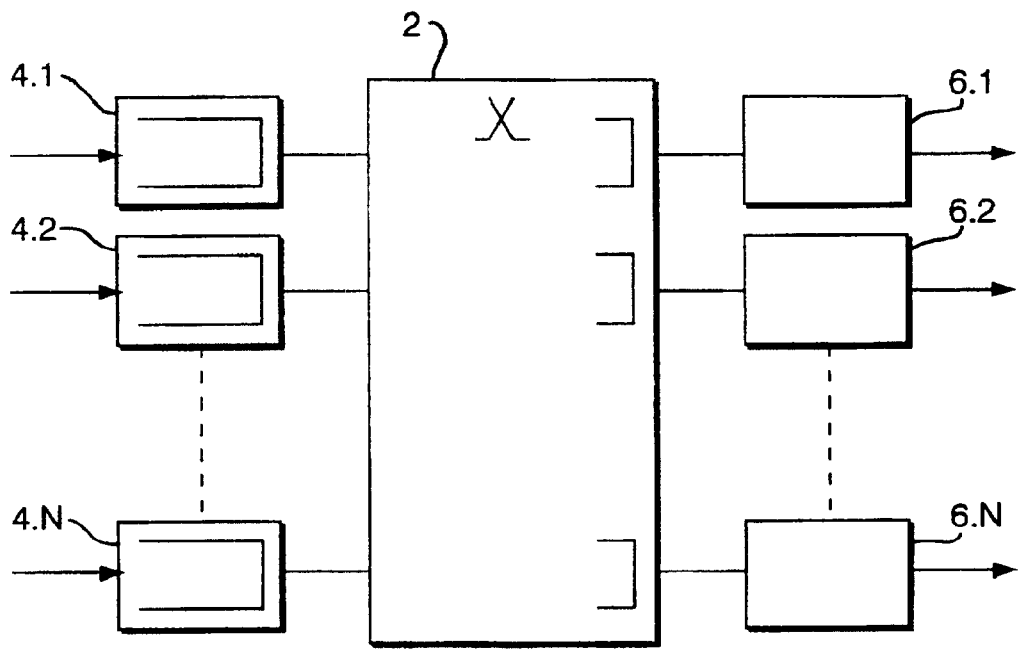
FIG. 1 is a schematic illustration of an input buffered switch.

FIG. 1 shows a switch of the type to which the present invention relates. A switching device 2 has N input ports 4.1, 4.2, ..., 4.N, each with an associated input buffer. Similarly, the switch 2 has N output ports 6.1, 6.2, ..., 6.N, each with an associated output buffer. Each input buffer can be thought of as being divided into N logical buffers, each associated with a respective one of the output ports, so that input cells received at a particular input port are stored in that input port's input buffer associated with the output port for which the cell is intended. However, in practice, the different logical buffers at each input port share a single input buffer associated with the input port, to increase buffer utilisation.

The present invention is concerned with improving the fairness of the way in which the output capacity of each output port is shared between the different input ports. Thus, it is desired to avoid a situation whereby a single connection, generating a large quantity of traffic for a particular output port, can reserve the whole of the capacity of that output port for a considerable time period. In such a situation, it is desired to allow cells which arrive on one connection to be transmitted before cells which have earlier arrived from busy connections.

In the context of the switching device shown in FIG. 1, one way to achieve this fairness would be to define one logical buffer per connection, and to take one cell from every non-empty buffer during each scheduling cycle. Such a system is known as "round-robin" scheduling. However, this means that the switch must maintain a large number of logical queues within the existing logical queues kept per output port at the input port. For example, the number of established connections may be of the order of thousands.

According to the present invention, an alternative approach is to rearrange the order at which cells are sent from the input buffer by keeping track of the number of cells from each connection that are stored in the input buffer. This allows greater fairness to be achieved, albeit requiring some processing when each cell is received. It should be noted that there will be described herein some of the cell handling procedures which are carried out, to achieve the desired degree of fairness. However, it will be noted that other cell handling procedures, well known to those skilled in the art, are also carried out. It will also be noted that the invention, as described, is particularly suitable for use with ABR (Available Bit Rate) and VBR (Variable Bit Rate) traffic. Continuous Bit Rate (CBR) traffic must be handled without delays, and so it may be let through the device as a separate stream. Alternatively, such traffic may be given the highest possible priority, to ensure that it is transmitted without suffering any delay.

Figure 2:
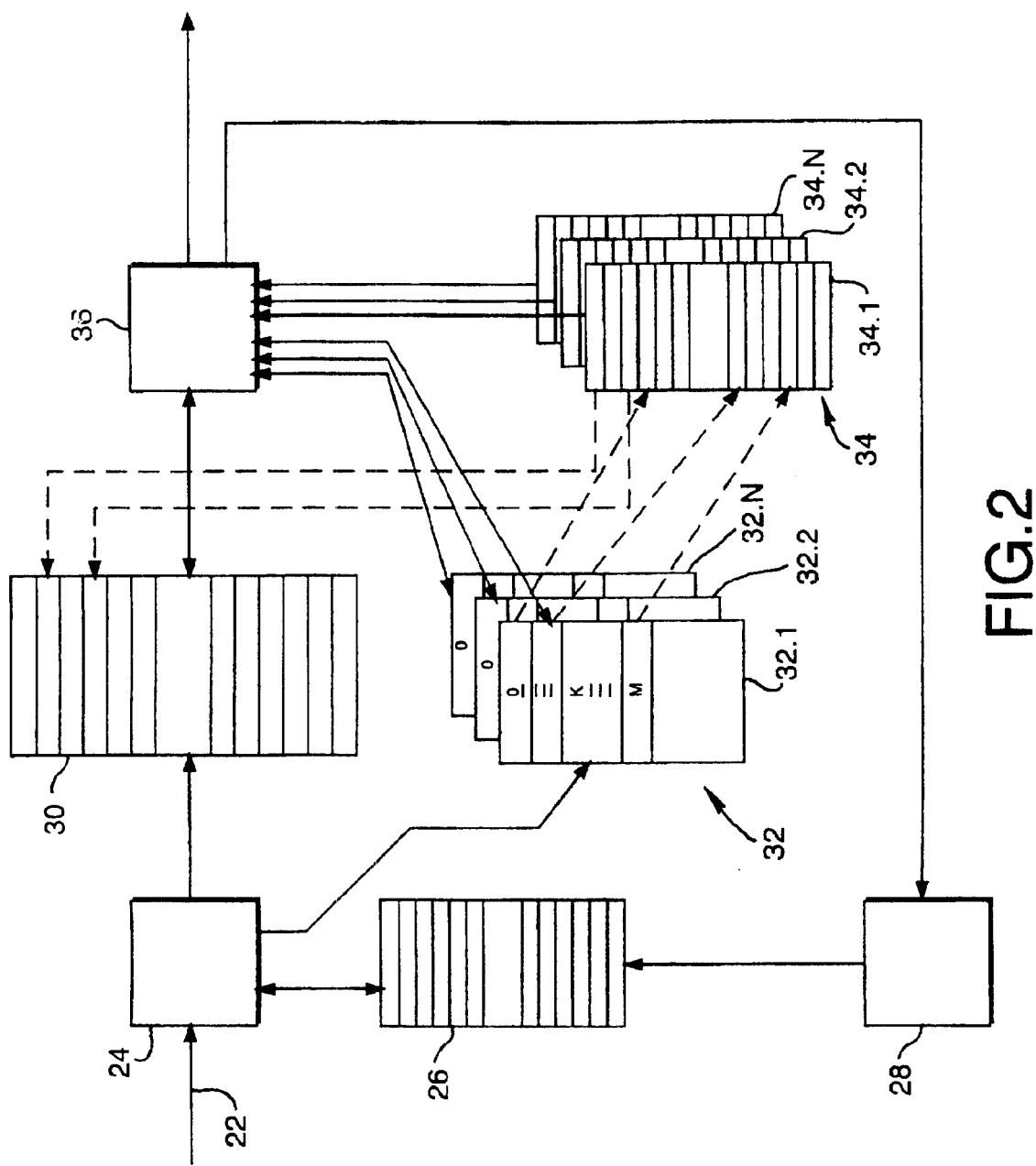
FIG. 2 is a schematic representation of a switching device in accordance with the invention.

FIG. 2 is a block schematic diagram of an input switching device in accordance with the invention. The device has an input connection 22, connected to a block 24, which calculates a "group sequence number" indicative of the priority to be given to any received cell. Connected to the block 24 is a look-up table 26, which stores information necessary for the calculation of the group sequence numbers, and which in turn receives information from a counter block 28. Input cells are stored in a buffer memory 30, which is shared amongst all of the connections to a particular input port. The block 24 is also connected to a memory 32, which includes a number of lists 32.1, 32.2, ..., 32.N, each of which is associated with a specific output port of the device. This memory 32 is connected to a second memory 34, which also contains lists 34.1, 34.2, 34.N, similarly associated with the output ports. The second memory 34, and the buffer memory 30, are connected to an output device 36, which is connected to transmit cells through the switching device. The output device 36 is also connected to the counter device 28. In the schematic diagram of FIG. 2, the various memories are shown separately, according to their function. However, it will be appreciated that they may be physically separate or they may be part of the same physical device, as convenient.

Figure 3A:
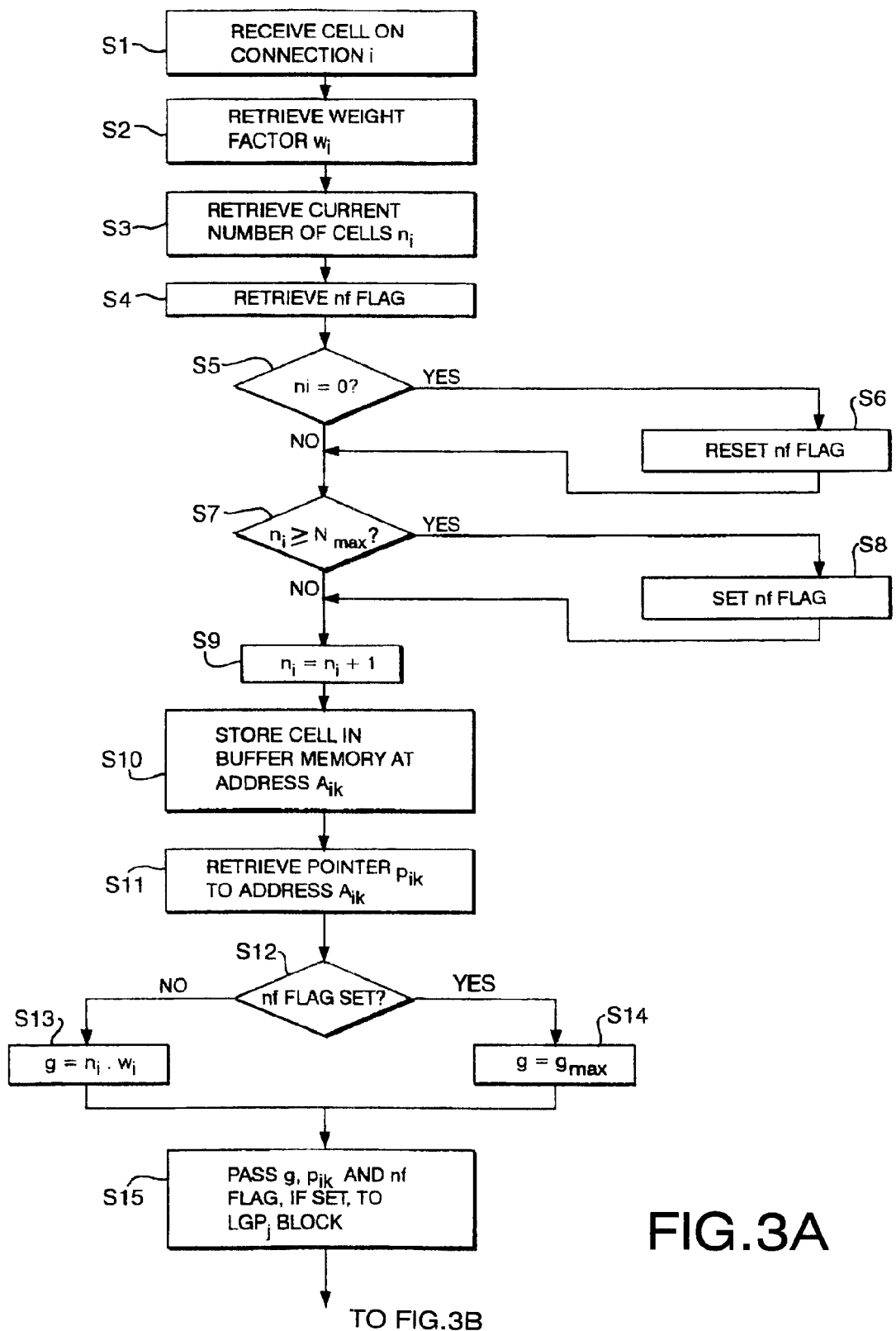
FIGS. 3A and 3B are parts of a flow chart illustrating a process for buffering received cells.
Figure 3B:
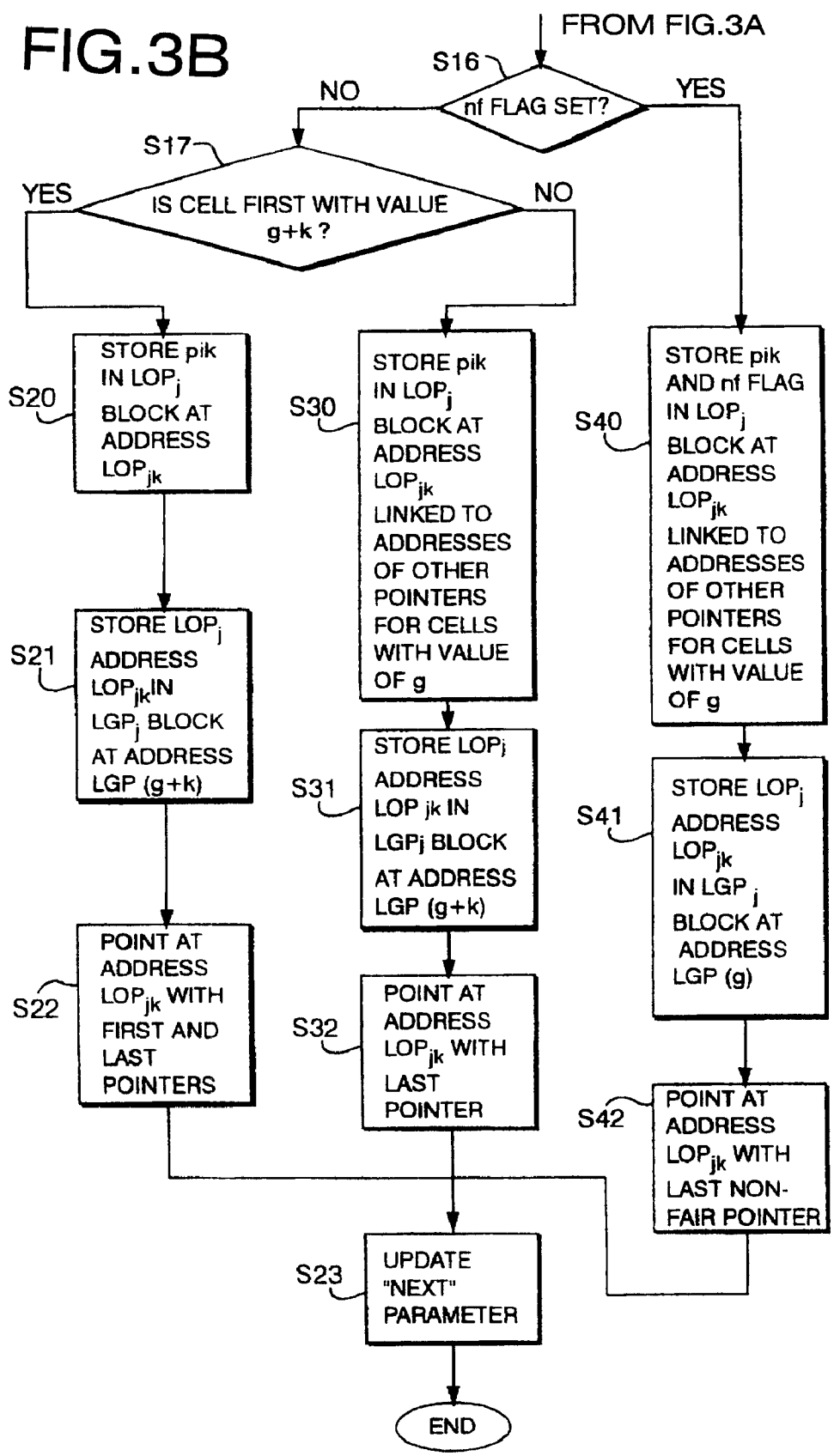

FIGS. 3A and 3B are parts of a flowchart showing the process by which a received cell is stored by the input switching device in accordance with the invention. The first step S1 is the receipt of a cell on a particular connection i of the input port. Following receipt of a cell, in step S2 a weight factor $w_i$, associated with the particular connection, is retrieved from the block 26. Similarly, in step S3, the current number of cells $n_i$, stored in the buffer memory having arrived at that connection, is also received from the block 26.

The weight factor is a parameter which may be defined by the user for each input connection, and allows the user to give higher priority to cells arriving at particular connections.

One of the aims of the present invention is that incoming cells should be treated in a "fair" way, to the extent that that is possible. That is, a connection on which there is a large burst of cells is not allowed to monopolise the capacity of the switch, but instead those cells may be dealt with after other, later arriving, cells from less busy connections are transmitted. However, in practice, it is not possible to achieve complete fairness, because the sorting mechanism of the switch would then need an unlimited capacity. Instead, a parameter is set such that, when the number of cells having arrived from a particular connection exceeds a certain level, further cells are treated in a "non-fair" way.

It should also be mentioned that, in the limit, it may be necessary for some cells to be discarded, if they exceed the capacity of the device to handle them. It is a matter of design choice as to how large the capacity should be, and as to how many cells need to have arrived before cells are to be treated in a non-fair way.

In practice, in the preferred embodiment, this is achieved by setting a flag nf to a value of 1 when a cell is to be treated in a non-fair way, but otherwise setting the flag nf to 0. Once the flag has been set to 1, it will only be reset to 0, allowing cells from that connection again to be treated in a fair way, when the switching device has reached a state where all of the cells from that particular connection have been transmitted. Thus, in step S4, the value of the nf flag is retrieved from block 26. Then, in step S5, it is determined whether $n_i=0$. If so, the nf flag is reset to 0 in step S6.

In either case, it is then tested in step S7 whether the number $n_i$ of buffered cells from that connection exceeds a preset threshold value $N_{max}$. If so, the nf flag is set in step S8.

In either case, the current value of $n_i$ is incremented by 1 in step S9, and then the cell is stored in step S10 in the buffer memory 30 at an address $A_{ik}$. A pointer $P_{ik}$ to the address $A_{ik}$ is then retrieved in step S11.

In step S12, it is determined whether the cell is to be treated in a fair or non-fair way. This is done by determining whether the nf flag has been set for that connection. If the flag is not set, a group sequence number, g, is calculated in step S13 as the product of $n_i$ and $w_i$. The group sequence number acts as an indication of the priority which is to be accorded to the particular cell.

If, on the other hand, the nf flag has been set, then, in step S14, the group sequence number g is set to its maximum value $g_{max}$.

Whether or not the cell is to be treated fairly, the group sequence number g, the cell pointer $P_{ik}$ and the nf flag, if it has been set, are passed in step S15 to the memory array, or last in group pointers block, 32, which stores further pointers.

As shown schematically in FIG. 2, the block 32 is made up of N lists, $LGP_j$, where j=1, 2, ..., N, one for each of the output ports of the switching device. Within each list, there are stored three pointers associated with every possible value of a search parameter k. When retrieving cells for transmission, the sending block cycles through the array 32 using the parameter k as an indication of the cells to be transmitted. Thus, pointers $P_{ik}$ to the cells in the buffer memory are stored on the LOP memory 34 at addresses which are accessible from the LGP array 32. To allow fair treatment of the cells, the respective LOP memory addresses are stored in the array 32 at locations which, in each case, depend on the value of the search parameter k when the cell was received, which is an indication of the location associated with the cells then being transmitted, and the value of g, which is an indication of the priority to be given to the cell. The locations are calculated as ((g+k) mod M), that is (g+k), or (g+k−M) when (g+k) exceeds M, the size of the array. This will generally be referred to herein as (g+k) for simplicity.

Thus, for each value of the search parameter k, in each list of the block 32, there are stored three pointers. The first indicates the location in LOP memory 34 of the first received cell pointer associated with the particular value of k. The second indicates the location in LOP memory 34 of the most recently received cell pointer associated with the value of k which is to be treated in a fair way. The third indicates the location in LOP memory 34 of the most recently received cell pointer associated with that value of k which is to be treated in a non-fair way.

The maximum value M of the parameter k, and hence the size of the array 32, is equal to the maximum value $g_{max}$ of the group sequence number g.

The cell pointer $P_{ik}$ in each case is stored in a second memory block, or list of pointers block, 34, which stores lists of cell pointers. As with the store 32, the store 34 is made up of N separate lists $LOP_j$, where j=1, 2, ..., N, each associated with one of the output ports of the switching device.

Accessing the cell pointers in block 34 through the further pointers in the array 32 can avoid the need to conduct a time-consuming search to find the correct location in block 34 at which the pointers should be stored.

In step S16, it is determined whether the nf flag has been set. If the flag has not been set, the process proceeds to step S17, where it is determined whether the received cell is the first cell with its specific value of g+k. If it is the first such cell, the process continues to step S20. There, the pointer $P_{ik}$ indicating an address in the buffer memory 30, is stored in the list of pointers memory 34, in the list LOPappropriate to the relevant output port, at an address $LOP_{jk}$.

Then, in step S21, that address $LOP_{jk}$ in the list $LOP_j$ is stored in the last in group pointers memory 32. The address is stored at a memory location in a list associated with the specific output port, at an address LGP(g+k). The address in the last in group pointers memory 32 is in a list associated with the specific desired output port, and at a location determined by the group sequence number allocated to the received cell and by the value of the parameter k at the time that the cell was received.

At that location in the memory 32 there are stored pointers, which indicate both the first received and the most recently received cells which are associated with the particular output port, and have the same value of (g+k). In the case, as here, where the cell is the first with the value (g+k), then, as shown in step S22, the memory location $LOP_{jk}$ in the list of pointers memory 34 is indicated by both the first and the last pointers in the last in group pointers memory 32. Finally, in step S23, the parameter "next", which is used when sending cells to find the next non-empty entry in the LGP memory 32, is then updated. That completes the storing process.

Where the arriving cell is not the first cell, associated with the particular desired output port, to have the value of (g+k), i.e. the answer to the question in step S15 is "NO", the process passes to step S30. As in step S20, the pointer to the location in the buffer memory 30 is stored in the appropriate list in the list of pointers memory 34, in the list $LOP_j$ associated with the desired output port, at an address $LOP_{jk}$. In this case, that address is linked to the addresses at which are stored the pointers for other cells which have the value of (g+k). As shown in step S31, the address $LOP_j$ is stored in the last in group pointers memory 32, again in the list $LGP_j$ associated with the desired output port, at an address LGP(g+k). In this case, the "last" pointer is updated to indicate that the address in $LOP_j$ is the address of the pointer for the most recently received cell having that desired output port and that calculated value of (g+k).

As before, in step S23, the parameter "next", which is used when sending cells to find the next non-empty entry in the LGP memory 32, is then updated. That completes the storing process.

If, in step S14, it is determined that the nf flag has been set, i.e. it is determined that the cell is to be treated in a non-fair way, the process passes to step S40. Similarly to step S30, the cell pointer $P_{ik}$ to the address in the buffer memory 30 is stored, together with the nf flag, in the list of pointers memory 34 in a list $LOP_j$ associated with the desired output port at an address $LOP_{jk}$ which is linked to the addresses of other pointers for cells which are also to be treated in a non-fair way, i.e. which have the maximum permissible group sequence number $g_{max}$, as set in step S11. In effect, therefore, the cell pointers of all cells which are to be treated in a fair way are effectively stored in front of cell pointers for cells which are to be treated in a non-fair way.

Therefore, again in a way similar to the treatment of the cells to be treated in a fair way, in step S41 the address $LOP_{jk}$ in the list $LOP_j$, associated with the relevant output port, is stored in the last in group pointers memory 32, within the list $LGP_j$ associated with the desired output port, at an address LGP(g). Thus, all of the addresses of the pointers to the cells from connections with the same value of g, which are to be treated in a non-fair way are accessed through the same location in the array 32. This means that the cells from any particular connection which are to be treated in a non-fair way are effectively handled on a first-in first-out basis.

Then, in step S42, the address $LOP_{jk}$ of the cell pointer is indicated in the last in group pointers memory 32 by the "last non-fair" pointer, indicating that that cell is the most recently received non-fair cell which has the group sequence number $g_{max}$. Finally, as with the fair cells, in step S23, the parameter "next", which is used when sending cells to find the next non-empty entry in the LGP memory 32, is then updated. That completes the storing process.

The process by which cells are sent from the switching device will now be described. FIG. 4 is a schematic illustration of the cells within each group sequence associated with the LGP array. In this case, the group of cells which is next for transmission is found at k=0. and the shaded boxes represent "non-fair" cells, which are linked on after the "fair" cells in each group.

The sending block 36 sends cells by picking the first in sequence in a group, with a particular value of the search parameter k, in the last in group pointer memory 32. Thus, for a particular group, the last in group pointer memory 32 indicates the addresses in the list of pointers memory 34, at which the relevant pointers are stored. These pointers are then used to retrieve the cells from the buffer memory 30 for transmission by the send block 36. In conjunction with all of the cells from connections to be treated fairly, within a group sequence, a certain number, for example up to a maximum $n_{nf}$, "non-fair" cells are also transmitted. Subsequently, the next group, that is the cells accessed through the next occupied value of (g+k) in the LGP array 32, is issued for transmission. In this way, the memory 32 is gone through in a cyclic manner.

After the transmission of a cell, the identification of the input connection is sent to an update block 28, which reduces by 1 the value of $n_i$ associated with that connection in the look-up table 26.

The system as described above allows the sharing of input port capacity to be comparatively fair. However, it should be noted that there is a trade off between fairness and system complexity. Thus, depending on the range of permitted values for g, the system can be made either more fair or more complex. With an extremely high maximum permitted value for g, a high degree of fairness can be achieved, but the system becomes somewhat complex. On the other hand, if the maximum permitted value of g were to be set at 1, the system would be more simple, but it would act as a conventional FIFO system. In effect, therefore, the system acts as a hybrid of fair queuing and FIFO queuing.

Moreover, although the system as described so far allows fair sharing of input port capacity, the most important aim is to achieve fair sharing of the output port capacity. This requires the coordination of the transmission of group sequences. Otherwise, input ports which have few active connections are more successful at getting cells through the switch than input ports which have many active connections. In order to achieve this fairness, the group sequences to be transmitted to a particular output port are advantageously all coupled, so that no input port is allowed to start sending a new group sequence before all of the other input ports have finished sending the current group sequence.

Figure 5:
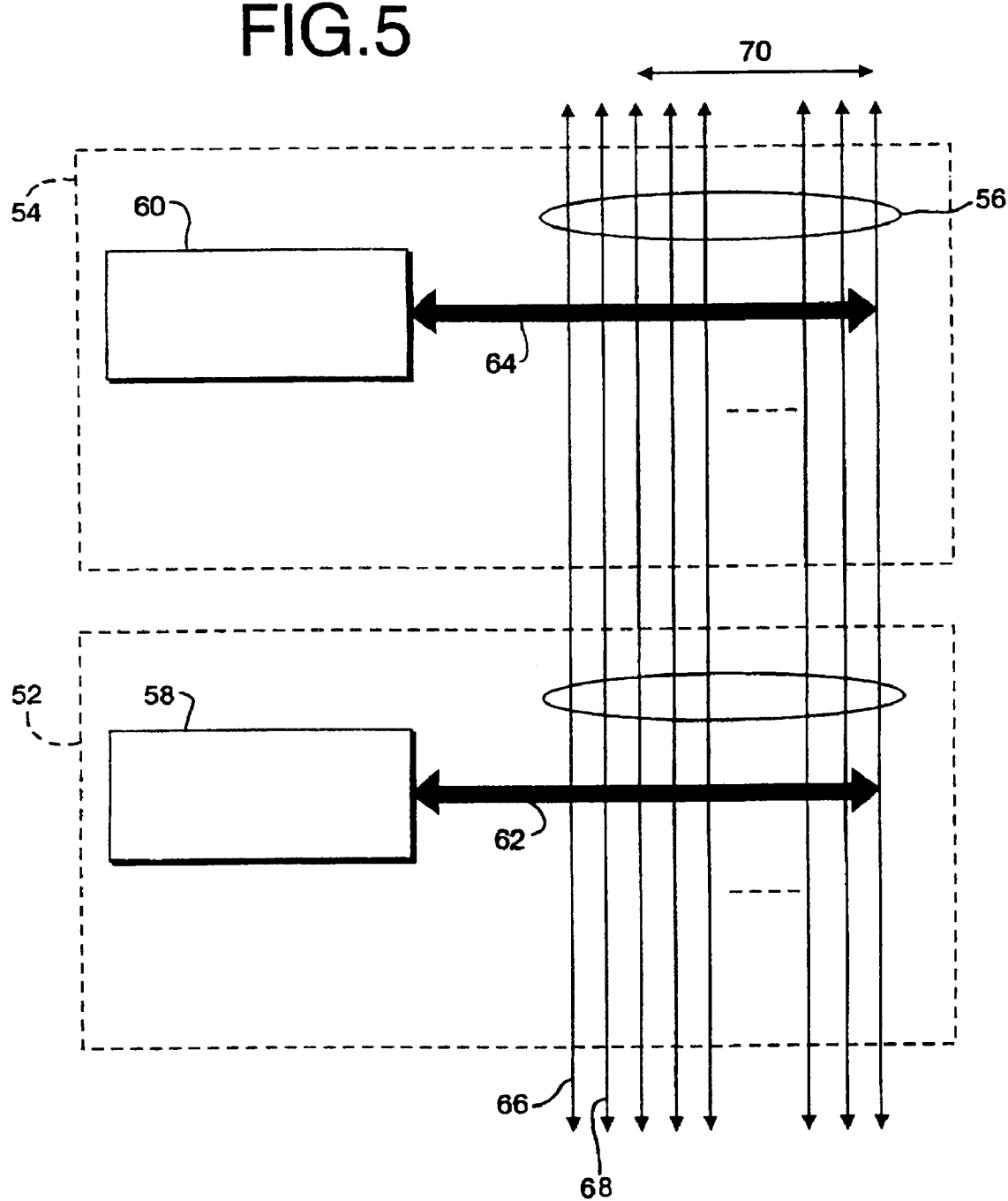
FIG. 5 is a schematic representation of a part of a switching device n accordance with another aspect of the invention.

FIG. 5 shows in schematic form a system which achieves the necessary fairness. FIG. 5 shows a first input port 52 and a second input port 54 (it will be appreciated that, in practice, there may be many more than two input ports), interconnected by an input coordination bus 56. The input ports 52, 54 have respective processing units 58, 60, which calculate the local fairness functions as described above, and which are connected to the bus 56 by respective lines 62, 64. A first channel 66 of the bus 56 is used to signal whether or not the current groups under transmission to the same output port are finished at all logical input ports. A second channel 68 of the bus 56 is used as a flow control signal from the output to the input. If an output port buffer is about to overflow, a signal can be sent on the channel 68 to stop the input ports from sending cells towards that output port. It should be noted that this arrangement is only feasible if the output ports are physically located on the same access boards as the input ports. The other channels 70 of the bus 56 are used to signal the current value of the parameter "next" valid on each logical input port. For example, there may be one of the channels 70 associated with each available value of the parameter. Then, for example, a "low" signal may be sent by that input port on the associated one of the channels 70. Then, in order to be allowed to send the next group sequence, the input port must have the same value of the parameter as the one indicated by the current one of the channels 70. This ensures that all of the input ports are transmitting cells with the same group sequence number at any one time. The maximum possible value for the value of the parameter "next" is equal to the highest value of the weighting parameter w, and so, as described above, there must be one of the channels 70 for every possible value of w. As an alternative, a coding system may be used, so that the values of the parameter "next" are signified by particular combinations of values of the signals on the channels 70. This will reduce the number of channels required, at the expense of some extra complexity.

Figure 6:
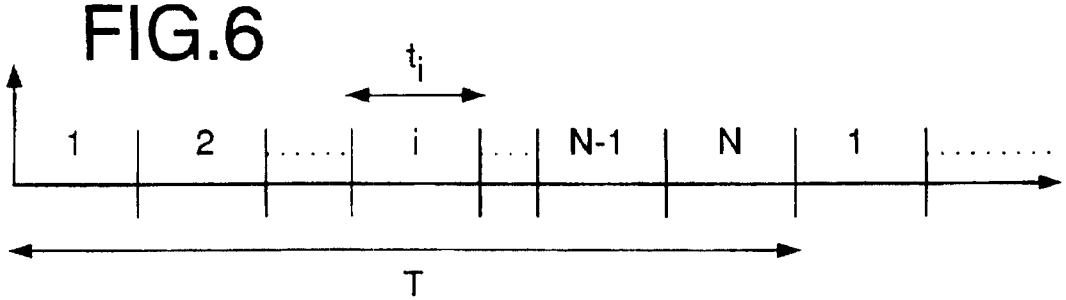
FIG. 6 is a representation of the way in which the control of the device of FIG. 5 is time division multiplexed.

As shown in FIG. 6, the bus 56 is time division multiplexed between the N output ports. The time period T is designed to be shorter than one cell emission interval, to ensure that the coordination is efficient, and avoids unused capacity, while each individual coordination interval $t_i$ must be long enough to allow all of the input ports to signal to, and detect signals on, the bus 56.

Figure 7:
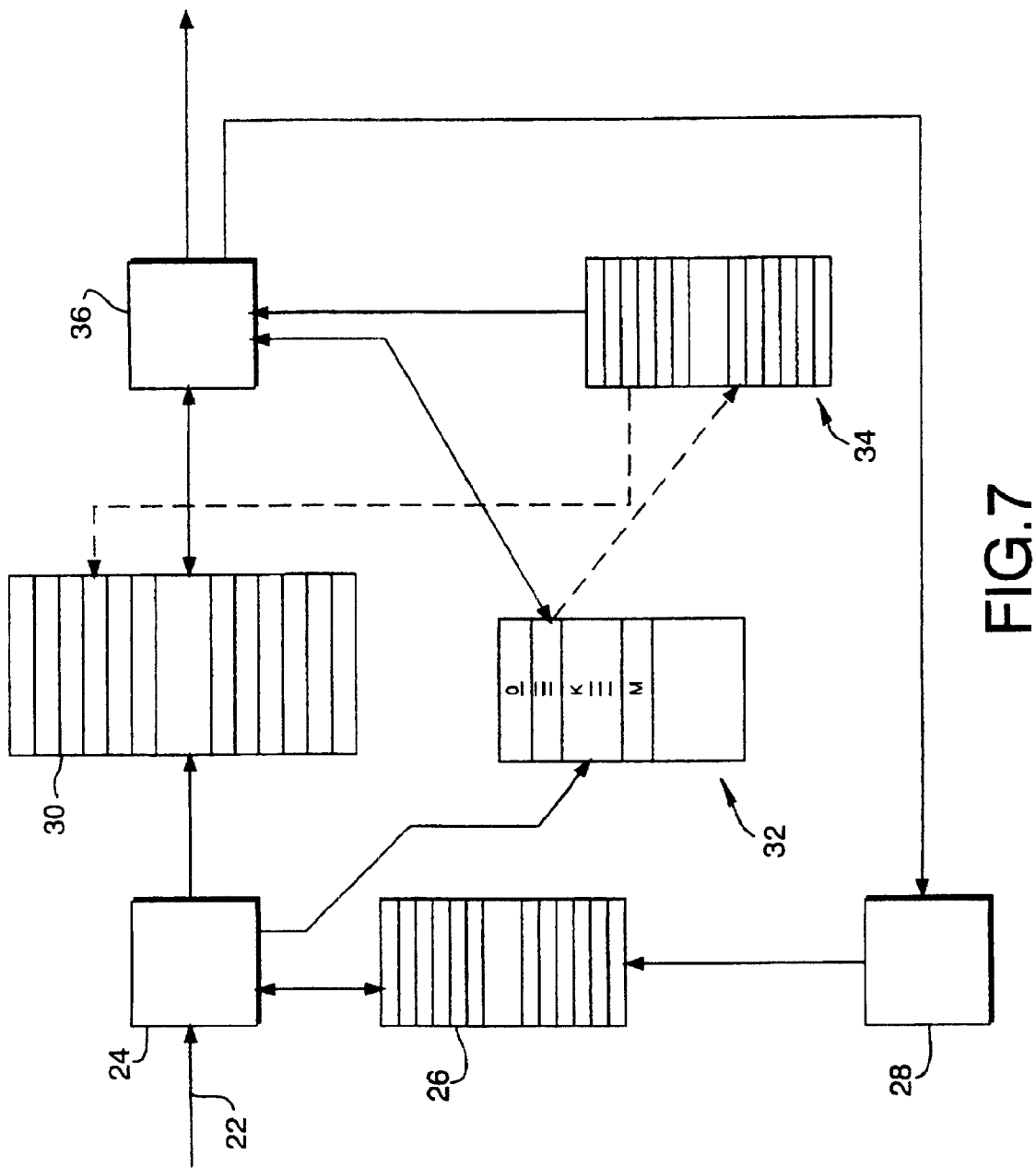
FIG. 7 is a schematic representation of a further switching device in accordance with the invention.

As described above, the mechanism operates on a system with relatively large input buffers coupled to relatively small output buffers. However, it should be noted that, if a purely output buffered switch is considered, the same local fairness algorithm may equally be applied to the output buffer directly, in order to provide fairness amongst the different connections. In such an arrangement, as shown in FIG. 7, only one LGP array and one LOP memory are needed for each output port. Otherwise, the arrangement is as shown in, and described with reference to, FIG. 2.

There are thus disclosed arrangements which allow the use of fair queuing algorithms, without requiring excessive processing or storage resources.

What is claimed is:

1. A packet data switch comprising:
    an input port, having a plurality of input connections thereto, for receiving data cells;
    means for connection to a plurality of output ports, for transmitting data cells thereto;
    means for assigning to each incoming data cell a parameter value indicative of a priority to be given to transmission of said data cell, wherein the parameter value assigned to each incoming data cell is determined by a priority level assigned to the input connection on which the data cell is received, and by the number of data cells from that input connection still awaiting transmission;
    an input buffer memory for storing the incoming data cells at addresses indicated by known pointers;
    a first memory for storing the pointers allocated to the incoming data cells at known locations; and
    a second memory for storing the known locations in an array addressable by means of the assigned parameter value, such that, when data cells are to be transmitted, the second memory can be used to retrieve from the first memory the pointer associated with the data cells which are next to be transmitted in terms of their priority; and
    wherein, when the number of data cells from an input connection still awaiting transmission exceeds a threshold, pointers associated with further incoming data cells on that connection are stored in the first memory at locations which are flagged, and all such further data cells are transmitted in accordance with a first-in, first-out process.

2. A packet data switch as claimed in claim 1, wherein the pointers are stored in the first memory at locations linked to the locations of pointers associated with other data cells having the same assigned parameter value, and the second memory stores indicators allowing access to locations of pointers associated with data cells having subsequent assigned parameter values.

3. A packet data switch as claimed in claim 1, wherein an output block, determining which data cells are next for transmission, cycles through the second memory, and wherein the indicators to the locations oft he pointers associated with incoming data cells are stored at locations in the second memory determined by the assigned parameter value and by the location in the second memory reached by the output block at the time when the incoming data cells were received.

4. A packet data switch as claimed in claim 1, wherein the first and second memories comprise separate respective lists associated with the different output ports.

5. A method of switching packet data from an input connection to an output port of an ATM switching device, the method comprising:
    storing each data cell in a buffer memory after arrival and before transmission, at an address indicated by a pointer;
    assigning to each data cell arriving at an input connection a parameter value indicative of a priority to be given to transmission of said data cell the parameter value being assigned on the basis of a priority level, assigned to the input connection on which the data cell is received, and the number of data cells from that connection awaiting transmission;
    storing the pointer in a first memory at a known location;
    storing the known location in a second memory such that it is addressable by means of the assigned parameter value, and
    transmitting data cells by using the second memory to retrieve from the first memory the pointer associated with the data cells which are next to be transmitted in terms of their priority, wherein
    when the number of data cells from a connection awaiting transmission exceeds a threshold, pointers associated with further incoming data cells on that connection are stored at locations in the first memory which are flagged, such that the further data cells are transmitted on a first-in, first-out basis.

6. A method as claimed in claim 5, comprising storing the pointers in the first memory at locations linked to the locations of pointers associated with other data cells having the same assigned parameter value, and storing indicators in the second memory allowing access to locations of pointers associated with data cells having subsequent assigned parameter values.

7. A method as claimed in claim 5, comprising determining which data cells are next for transmission by cycling through the second memory, and comprising storing the indicators to the locations oft he pointers associated with incoming data cells at locations in the second memory determined by the assigned parameter value and by the location in the second memory reached by the transmission cycle at the time when the incoming data cells were received.

8. A method as claimed in claim 5, comprising dividing the first and second memories into separate respective lists associated with the different output ports.

* * * * *

UNITED STATES PATENT AND TRADEMARK OFFICE
CERTIFICATE OF CORRECTION

PATENT NO.     : 6,490,640 B1
DATED          : December 3, 2002
INVENTOR(S)    : Per Johansson It is certified that error appears in the above-identified patent and that said Letters Patent is hereby corrected as shown below:

Column 40,
Line 50, replace "LOPappropriate" with -- $Lop_j$ appropriate --

Column 8,
Line 9, replace "oft he pointers" with -- of the pointers --
Line 56, replace "oft he pointers" with -- of the pointers --

Signed and Sealed this

Twenty-second Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,490,640 B1                                        Page 1 of 1
DATED           : December 3, 2002
INVENTOR(S)     : Per Johansson It is certified that error appears in the above-identified patent and that said Letters Patent is hereby corrected as shown below:

Column 4,
Line 50, replace "LOPappropriate" with -- $LOP_j$ appropriate --

Signed and Sealed this

Third Day of February, 2004

JON W. DUDAS
*Acting Director of the United States Patent and Trademark Office*